Oct. 17, 1950   W. A. BEDFORD, JR   2,526,531
FASTENER MEMBER
Filed Jan. 13, 1948
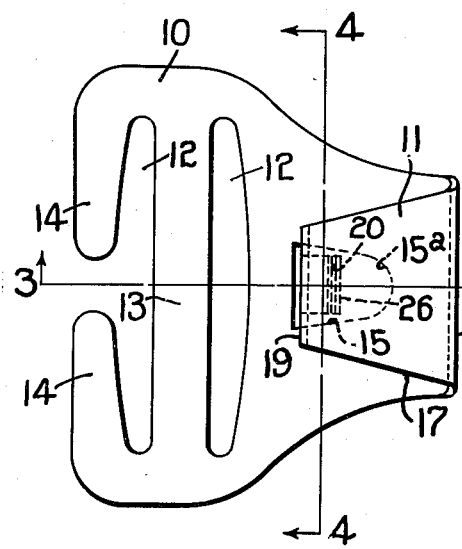
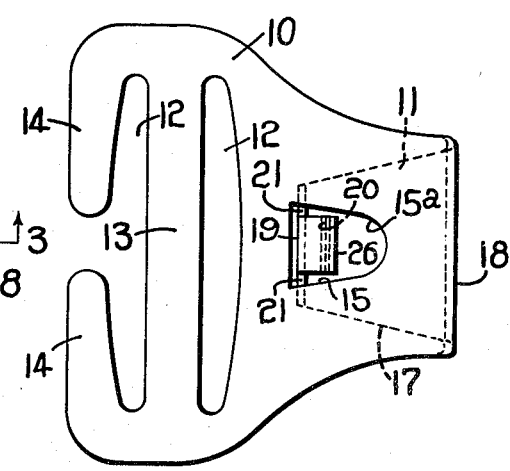
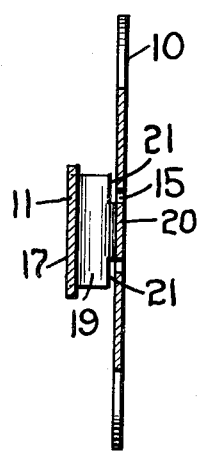
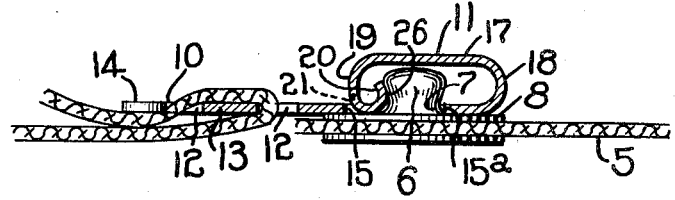
INVENTOR:
WILLIAM A. BEDFORD JR.
BY Philip E. Parker
ATTORNEY.

Patented Oct. 17, 1950

2,526,531

UNITED STATES PATENT OFFICE 2,526,531

FASTENER MEMBER

William A. Bedford, Jr., North Scituate, Mass., assignor to United-Carr Fastener Corporation, Cambridge, Mass., a corporation of Massachusetts Application January 13, 1948, Serial No. 2,031

3 Claims. (Cl. 24—216)

1

The present invention relates to fastener members, and more particularly to a combined buckle and fastener suitable for connecting a strap or the like to a stud-carrying part by a snap fastener action.

More particularly, the invention aims to provide an improved simplified, one-piece buckle for suspenders, overall and like straps adapted to be adjustably secured to a strap and also adapted for snap fastening engagement with a stud-carrying part.

A further object is to provide an improved snap fastener socket member formed of a single piece of flat strip material adapted for snap fastening engagement with a ball type stud member.

Other aims and advantages of the invention will be apparent to persons skilled in the art from a consideration of the accompanying drawings and annexed specification illustrating and describing a preferred form of the invention.

In the drawings:

Fig. 1 is a top plan view of the buckle and fastener;

Fig. 2 is a bottom plan view of the buckle and fastener shown in Fig. 1;

Fig. 3 is a longitudinal sectional view of the fastener as taken on the line 3—3 of Fig. 1, and illustrating the fastener in snap fastened engagement with a stud member; and Fig. 4 is a transverse sectional view thereof as taken on the line 4—4 of Fig. 1.

Referring to the drawings, the fastener member preferably is a combined buckle and fastener and is preferably formed from a single piece of sheet metal having a relatively wide buckle body 10 and a substantially narrower fastener body portion 11. The buckle body 10 is provided with a plurality of transverse slots 12 inwardly of the end and spaced apart to provide an intermediate strap bar 13 spaced inwardly from the end bar 14 and about which the end portion of a strap, belt or the like may be secured as will be understood in the art.

The body 11 of the fastener, forwardly of the inner slot 12 is provided with an elongated stud-receiving opening 15 having an arcuate edge 15ª remote from the buckle end of the device. The forward portion of the opening 15, toward the buckle end, is preferably of greater width than the diameter of the arcuate end 15ª so as to readily receive the head of a snap fastener stud attached to a stud-carrying part 5, said stud having a bulbous head 6 and a reduced neck portion 7 adjacent the base flange 8 thereof. The stud 6 may be of any of the conventional types of snap fastener studs.

2

The fastener socket portion 11 of the fastener is adapted to have snap fastening engagement with a stud 6 by means of a spring element, preferably formed as a continuation of and superimposing the apertured body.

The body portion 11 of the fastener socket, beyond the stud-receiving aperture 15, is reversely bent to looped form superimposing and extending rearwardly of the opening 15 providing a bridge 17 connected to the body 11 by a resilient bight 18. The rear end of the bridge 17 is turned downwardly as at 19 toward the body 11 and is provided with an inwardly curled tongue 20 disposed in the opening 15 and presenting an arcuate bearing surface 26 adapted for tensioned engagement against the stud head 6 to hold the neck 7 securely against the arcuate edge 15a of the aperture 15. As will be apparent from Fig. 4, the downwardly turned portion 19 of the bridge 17 is of greater width than the locking tongue 20 which is disposed in the stud-receiving aperture 15. Preferably the tongue 20 is joined to the portion 19 by abrupt shoulders 21 normally spaced slightly above the body 11 and thus serving as a stop means to limit relative transverse movement of the tongue 20 in the opening 15. Thus the locking tongue is normally disposed in the stud-receiving opening 15 out of contact with the body 11, and undue distortion of the bridge 17, due to compression forces, is prevented by the stop means 21.

The fastener of the invention is simple in construction and economical of manufacture. The particular disposition of the locking tongue 20 in the stud-receiving opening 15 is of advantage as it contributes to the long life and easy working of the fastener.

Although I have illustrated and described a preferred form of the invention, I do not intend to be limited thereto as the scope of the invention is best defined in the appended claims.

I claim:

1. A fastener member adapted for snap fastening engagement with a stud member having a bulbous head and a reduced neck portion, said fastener member being formed of resilient strip material and comprising a body having a stud-receiving opening and a reversely bent portion disposed in spaced relation to and opposite said opening, said opening having a stud neck-engaging portion at one end thereof, a tongue member connected to said reversely bent portion and extending into said opening, said reversely bent portion having means thereon adapted to engage said body for limiting transverse movement of said tongue in said opening, stud neck-engaging means on said tongue member opposite and spaced from said neck-engaging portion, said stud neck-engaging means adapted to yieldingly engage the reduced neck portion of a bulbous headed stud member and resiliently press it against said stud neck-engaging portion.

2. A fastener member adapted for snap fastening engagement with a stud member having a bulbous head and a reduced neck portion, said fastener member being formed of resilient strip material and comprising a body having a stud-receiving aperture with a stud neck-engaging portion at one end thereof, a bridge member disposed opposite said aperture and connected at one end to said body by a resilient bight portion, an arm depending from said bridge member at the end opposite said bight portion and having an inwardly curled tongue at the end thereof extending into said aperture, means on said arm adapted to engage said body for limiting movement of said tongue in said aperture transversely of said body, and stud neck-engaging means on said tongue opposite and spaced from said stud neck-engaging portion adapted to yieldingly engage the reduced neck portion of a bulbous headed stud member and resiliently press it against said stud neck-engaging portion.

3. A fastener member adapted for snap fastening engagement with a stud member having a bulbous head and a reduced neck portion, said fastener member being formed of resilient strip material and comprising a body having a stud-receiving opening, a bridge member disposed opposite said opening and connected at one end to said body by a resilient bight portion, an arm connected to said bridge member opposite said resilient bight portion and extending toward said opening, a curled tongue connected to said arm and extending into said opening, said tongue being of less width than said arm forming shoulders normally spaced from said body but movable into contact therewith to limit movement of said tongue in said opening transversely of said body, and stud neck-engaging means on said tongue opposite and spaced from said stud neck-engaging portion adapted to yieldingly engage the reduced neck portion of a bulbous headed stud member and resiliently press it against said stud neck-engaging portion.

WILLIAM A. BEDFORD, Jr.

REFERENCES CITED

The following references are of record in the file of this patent:

UNITED STATES PATENTS

| Number | Name | Date |
|---|---|---|
| 566,340 | Richardson | Aug. 25, 1896 |
| 1,691,453 | Alterson | Nov. 13, 1928 |
| 1,796,525 | Johnson | Mar. 17, 1931 |

FOREIGN PATENTS

| Number | Country | Date |
|---|---|---|
| 120,124 | Great Britain | Oct. 5, 1918 |